US006135148A

United States Patent [19]

Hinson

[11] Patent Number: 6,135,148

[45] Date of Patent: Oct. 24, 2000

[54] AIR HYDRAULIC REMOTE CONTROL DEVICE

[75] Inventor: Virgil H. Hinson, Brunswick, Ga.

[73] Assignee: Grabber Manufacturing Co., Ltd., Brunswick, Ga.

[21] Appl. No.: 09/201,552

[22] Filed: Nov. 30, 1998

[51] Int. Cl.[7] ...................................................... F16K 11/22

[52] U.S. Cl. ...................................... 137/565.01; 137/883

[58] Field of Search ................................ 137/883, 565.01

[56] References Cited

U.S. PATENT DOCUMENTS

| | | | |
|---|---|---|---|
| 3,552,436 | 1/1971 | Stewart | 137/883 |
| 4,004,863 | 1/1977 | Porel . | |
| 4,099,742 | 7/1978 | Wright . | |
| 4,491,157 | 1/1985 | Hashimoto . | |
| 4,498,500 | 2/1985 | Miller | 137/883 |
| 4,570,677 | 2/1986 | Roxton et al. | 137/883 X |
| 4,777,981 | 10/1988 | Petro | 137/636.2 |
| 5,213,310 | 5/1993 | Beattie et al. . | |
| 5,394,903 | 3/1995 | Tominaga . | |
| 5,782,158 | 7/1998 | Rothering . | |

OTHER PUBLICATIONS

Parts List For Model F Air/Hydraulic Pump, Form No. 101732, Power Team , Re V. 4, Date: Sep. 5, 1997.

*Primary Examiner*—Gerald A. Michalsky
*Attorney, Agent, or Firm*—Price Gess & Ubell

[57] ABSTRACT

A remote control device for providing air actuation of a hydraulic pump and having a remote control valve body with an air supply inlet at its bottom and first and second air ducts leading from the air supply inlet to respective first and second air valve chambers. First and second air outlets on opposite sides of the device communicate respectively with the first and second air valve chambers, and first and second air valves are positioned in the respective first and second air valve chambers to control air flow from a respective one of the first and second air ducts to a respective one of the air outlets. Additionally, a piston and cylinder device with an anti-vacuum vent is provided which is actuable in response to air pressure supplied through one of the air outlets to actuate a piston slideably mounted over a release button of a hydraulic pump.

14 Claims, 5 Drawing Sheets

AIR HYDRAULIC REMOTE CONTROL DEVICE

BACKGROUND OF THE INVENTION

1. Field of the Invention

The subject invention relates generally to hydraulic apparatus and more particularly to an improved remote control apparatus for providing air actuation and deactuation of a hydraulic pump.

2. Description of Related Art

Remote control devices providing air actuation of hydraulic apparatus are known in the prior art. However, the known devices are relatively expensive and complex. Thus, a need has arisen for an improved remote control device which features both simplicity and low cost.

SUMMARY OF THE INVENTION

According to the invention, a remote control device is provided having a remote control valve body with an air supply inlet and first and second air ducts leading from the air supply inlet to respective first and second air valve chambers. First and second air outlets communicate respectively with the first and second air valve chambers, and first and second air valves are positioned in the respective first and second air valve chambers. Each of the air valves includes a switch which is actuable to cause air to be communicated from a respective one of the first and second air ducts to a respective one of the air outlets. When actuated, one of the air valves is opened to cause a hydraulic pump to operate, while the second air valve causes hydraulic pressure supplied by the pump to be released.

Additionally, a means is provided which is actuable in response to air pressure supplied through one of the air outlets to actuate a piston slideably mounted in the means therefor. The means therefor is positioned over a hydraulic pressure release button.

BRIEF DESCRIPTION OF THE DRAWINGS

The present invention, both as to its organization and manner of operation, will now be described in detail with reference to the following detailed description, taken in conjunction with the accompanying drawings, of which.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art.

Figure 1:
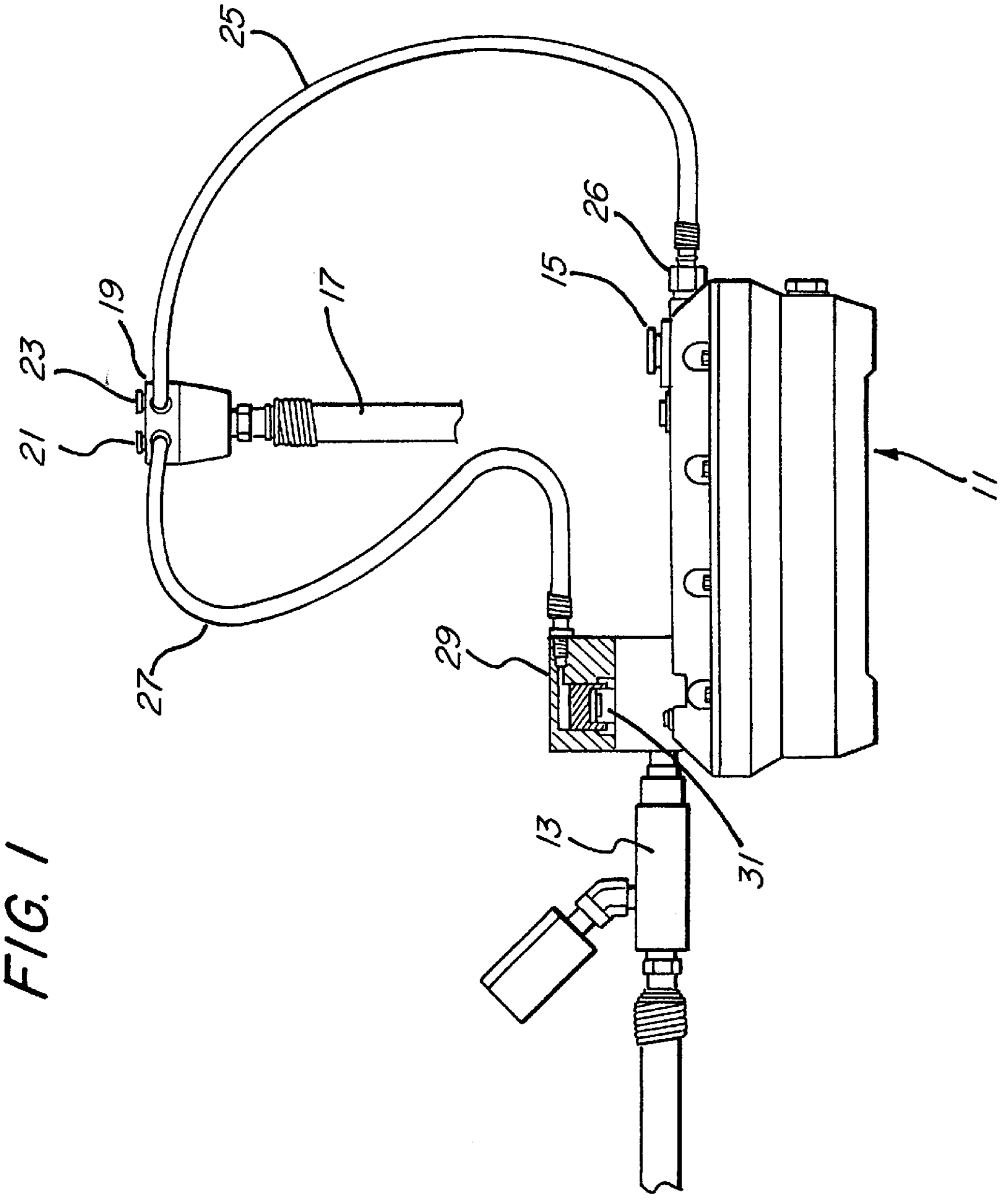
FIG. 1 is a side plan view illustrating the preferred embodiment.

Remote control apparatus according to the preferred embodiment is illustrated in FIG. 1. The remote control apparatus operates in conjunction with a conventional hydraulic pump 11, which supplies hydraulic pressure through a conventional fitting 13 to a source such as a hydraulic ram. Hydraulic pumps, such as pump 11, are conventionally foot pedal actuated by a hydraulic pump release button 31 or an actuation pedal 15. Conventionally, hydraulic pressure is applied by foot actuation of pedal 15 and is terminated by foot actuation of the release button 31. Actuation of the foot pedal 15 conventionally allows compressed air to enter at the point of fitting 26 through an "air chuck" connection. The compressed air is used by the hydraulic pump 11 to generate hydraulic pressure, e.g., on the order of 10,000 lbs.

According to the preferred embodiment, a hand held remote control device 19 is provided which communicates via a first air line 25 to the fitting 26 and via a second air line 27 to a release valve 29. The remote control 19 includes first and second actuation buttons 21, 23. The first button 23 applies air pressure through the air line 25 to start the hydraulic pump 11 running. The second button 21 may then be actuated to cause the release valve 29 to terminate or release the provision of hydraulic pressure by the pump 11. Air under pressure is supplied to the remote control 19 via an air supply line 17, which may be an air line or hose such as is typically available in automotive repair shops. Additionally, the actuation pedal 15 is clipped permanently down by a suitable clip or clamp to facilitate operation according to the preferred embodiment.

Figure 3:
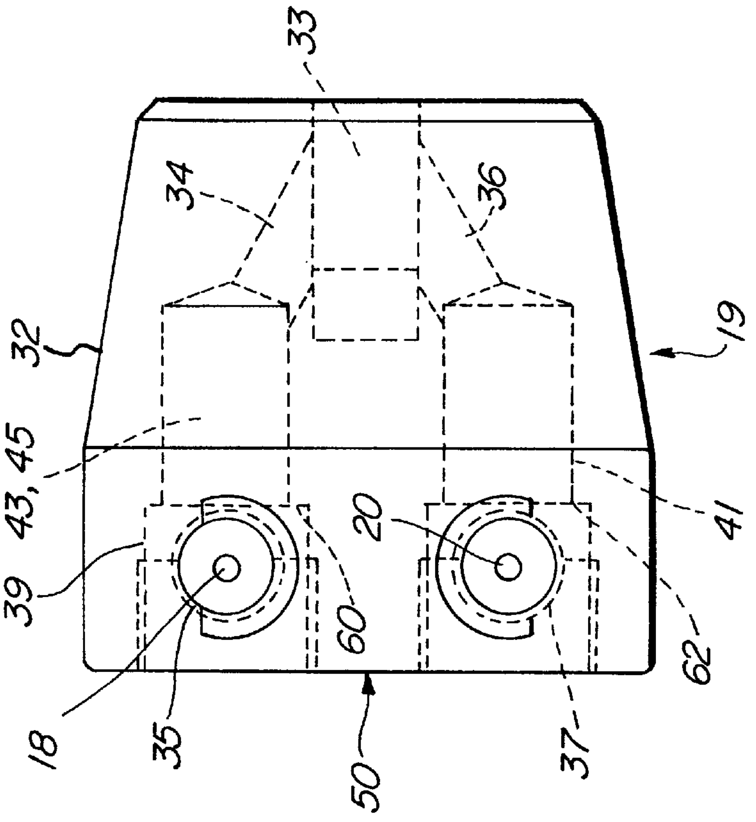
FIG. 3 is a side view of the control valve of FIG. 2.
Figure 2:
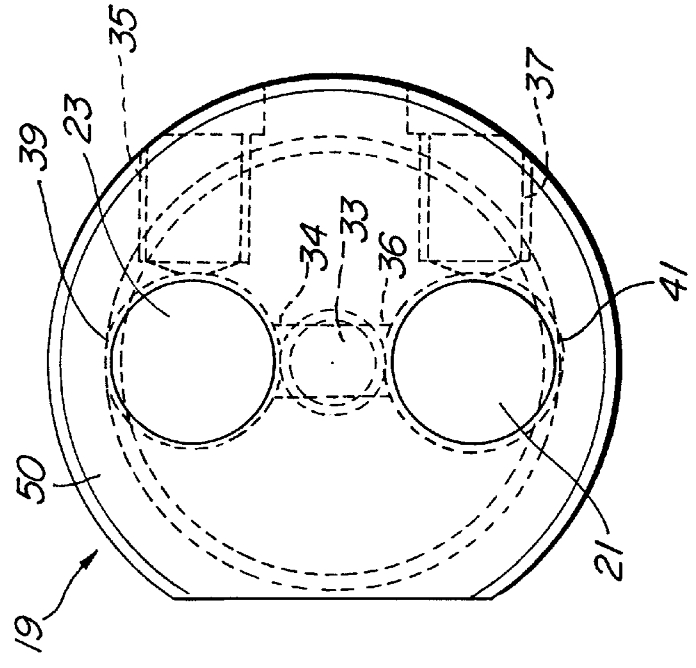
FIG. 2 is a top view of a control valve according to the preferred embodiment.

The hand held remote control 19 is shown in more detail in FIGS. 2 and 3. As shown, the remote control 19 includes a cylindrical air supply inlet 33 to which air supply hose 17 (FIG. 1) is attached. The supply inlet 33 branches off via generally cylindrical ducts 34, 36 to respective concentrically cylindrical air valve chambers 39, 41. Respective cylindrical air outlets 35, 37 communicate with the respective air valve chambers 39, 41 so that air may pass from the supply inlet through one of the respective ducts 34, 36 and out respective holes 18, 20 in one of the corresponding outlets 35, 37, depending on which of the release buttons 21, 23 is manually depressed. The air outlet passageways 35, 27 are preferably threaded to receive suitable coupling members so as to permit "quick-disconnect" hook-up and detachment of the air lines 25, 27.

Figure 6:
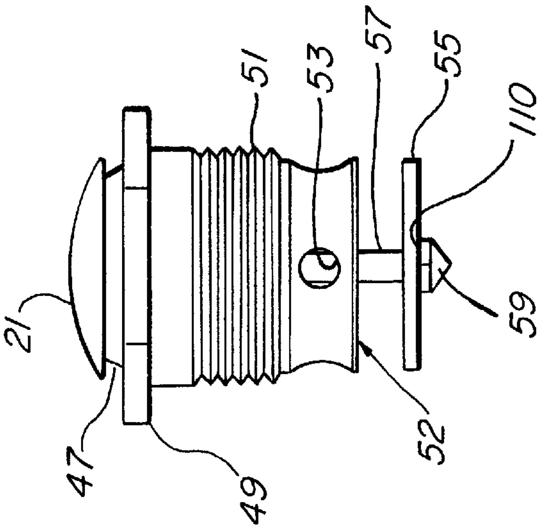
FIG. 6 is a side view of the valve of FIG. 4 with the control button depressed.
Figure 4:
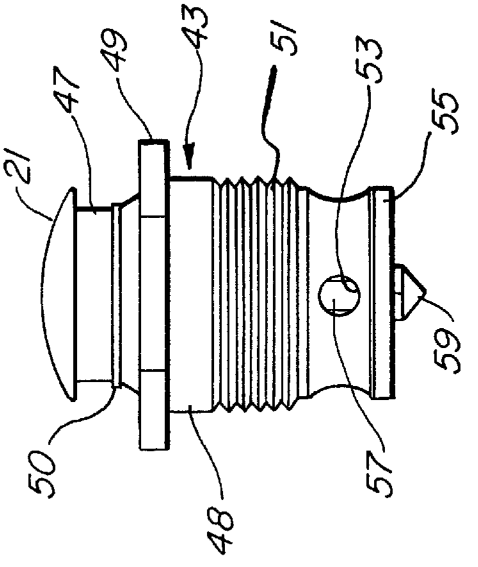
FIG. 4 is a side view of an air valve according to the preferred embodiment.
Figure 5:
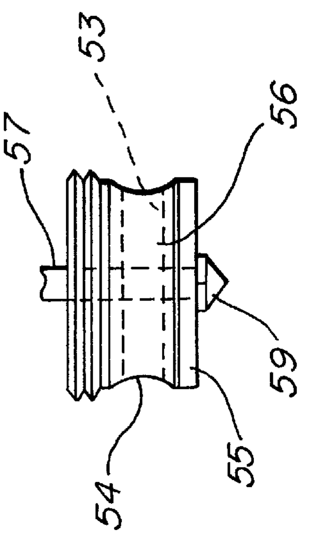
FIG. 5 is a partial side view of the valve of FIG. 4.

Both air valves 43, 45 are identical in construction, and one such valve 43 is illustrated in further detail in FIGS. 5 and 6. The air valve 43 includes the button 21, a stem 47 attached to the button 21, a plunger 57 and a nose portion 59. The nose portion 59 has a flat rear surface 110. The plunger 57 and nose 59 may be fabricated as a single unitary metal piece, for example, by suitable machining, and then attached to the shaft 47 by threading or other conventional methods. Alternatively, the elements 21, 47, 57, etc. may comprise two or more discrete pieces attached together by various conventional techniques, e.g., by welding.

The cylindrical stem 47 slideably mounts for vertical reciprocation in a valve body 48. A flexible seal 50 is fitted around the stem 47 and between the stem 47 and a flange 49 formed on the valve body 48. The seal 50 prevents "blow back" of compressed air through the valve 43 and tends to bias the button 21 in the closed position.

The valve body 48 includes the flange 49, a threaded region 51 and an air supply hole 53. As shown in FIG. 5, the air supply hole 53 communicates through a passageway 56 with a second air supply hole 54 on the opposite side of the body 48 such that air may pass through the body 48. The threads 51 permit each of the air valves 43, 45 to be threadably inserted into the respective air chambers 41, 39 until their respective flanges 49 sealingly abut the top surface 50 of the remote control 19. The bottom end 52 of the valve body is closed except for an opening which permits passage and reciprocation of the plunger 57. This opening is made wider in diameter than the plunger 57 so that air may pass around the plunger 57 and into the passageway 56. The openings 53, 54 are preferably slightly smaller than the holes 18, 20 in the remote control body. For example, the holes 18, 20 may be ⅜ inch in diameter, while the openings 53, 54 are ⅛ inch in diameter.

A gasket/seal 55 is attached at one end of the plunger 57 and is retained by the nose portion 59. The disc-shaped gasket 55 may be constructed so that it can be attached by forcing it over the nose 59, such that it slideably rides on the plunger 57. The air valves 43, 45 are so dimensioned that a respective rubber seal or gasket 55 normally rests on shoulder 60, 62 of the remote control body and closes off the air supply from a duct, e.g. 34, to the air supply hole 53. The air pressure provided through the air supply inlet 33 tends to push the nose portion 59 upward, maintaining it in a normally sealed position against the gasket 55.

Figure 7:
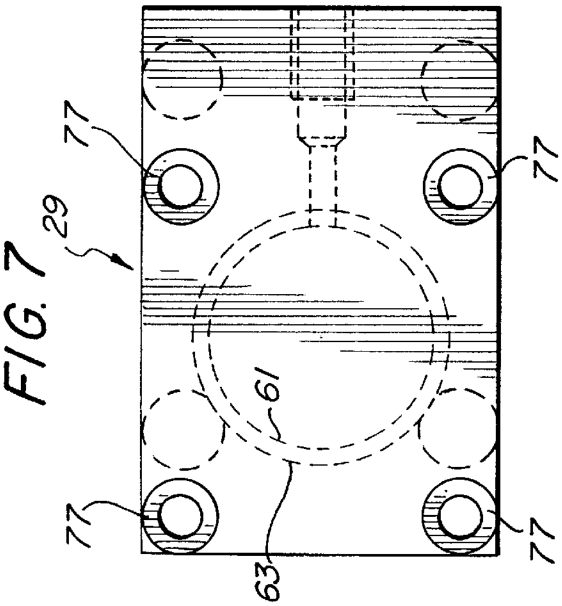
FIG. 7 is a top view of a piston and cylinder device according to the preferred embodiment.
Figure 8:
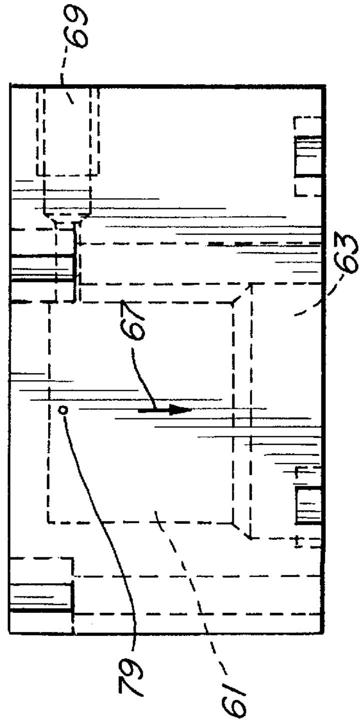
FIG. 8 is a side view of the piston and cylinder device of FIG. 7.
Figure 9:
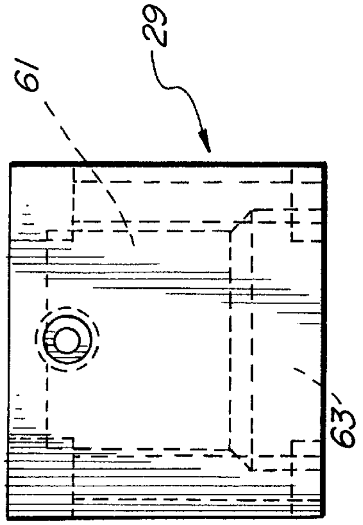
FIG. 9 is an end view of the piston and cylinder device of FIG. 8.

The hydraulic piston and cylinder device according to the preferred embodiment is shown in more detail in FIGS. 7 through 11. As seen in FIGS. 7 through 9, the device preferably comprises a block of metal with rectangular side faces, i.e., a rectangular parallelepiped. A cylindrical release valve chamber 61 is bored into the block, as well as a concentric release button chamber 63 of a somewhat larger diameter than the release valve chamber 61. The release valve chamber 61 slideably receives a release valve piston 65 shown in FIGS. 10 and 11. The release button chamber 63 receives the release button 31 (FIG. 1). As indicated, the release button 31 is depressed by the piston 65 in the direction of the arrow 67 upon supply of air to the release valve chamber 61 via an air supply inlet 69. The hydraulic release valve 29 further includes four counter sunk bores 77 to receive mounting screws for attaching the valve to the hydraulic pump 11.

Figure 10:
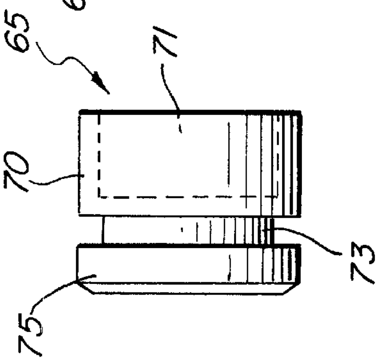
FIG. 10 is a side view of a piston according to the preferred embodiment.
Figure 11:
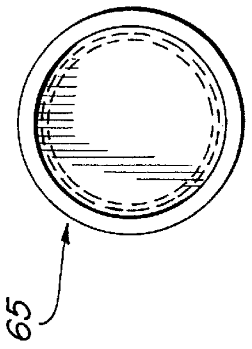
FIG. 11 is an end view of the piston of FIG. 10.

As may be seen in FIGS. 10 and 11, the release valve piston 65 includes an upper portion having an outer cylindrical contour 70 and an inner cylindrical cutout 71 formed therein. The piston 65 further includes an annular o-ring channel 73 and a cylindrical head portion 75, which contacts and depresses the release button 31.

The side of the device 29 also includes a tiny hole 79 drilled therein, which communicates with the release valve chamber 61. This hole 79 serves as an "anti-vacuum vent," which prevents the release button 31 from being continuously depressed by letting air out of the chamber 61 during intervals when the actuation button 21 is not depressed, thereby permitting the hydraulic release button 31 to spring back up into its normal position.

Figure 13:
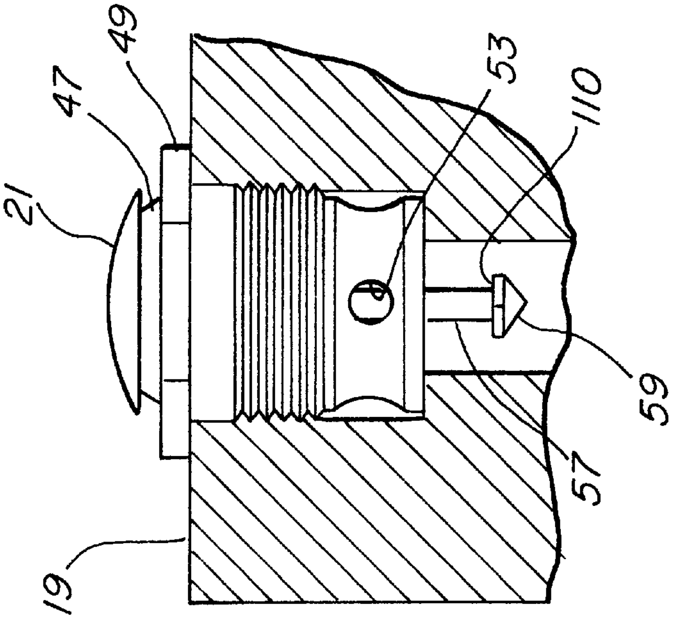
FIG. 13 is view of the cross section of FIG. 12 with the air valve in the open position.
Figure 12:
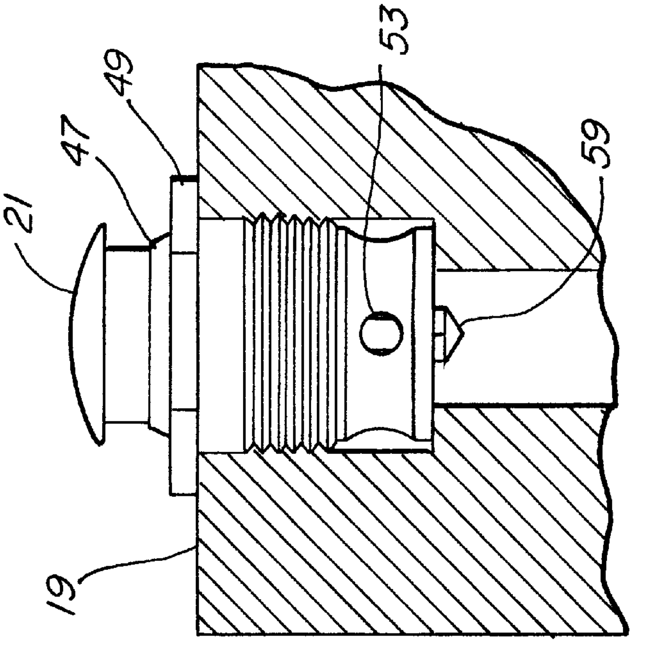
FIG. 12 is a cross sectional view of a portion of the control valve with air valve installed and in a closed position.

Operation of the preferred embodiment may be considered with reference to FIGS. 12 and 13. In operation, when one of the buttons 21, 23 is pressed down, the seal between the gasket 55 and the back surface 110 of the nose portion 59, which normally closes off the air supply, is opened thereby permitting air to flow through the central opening in the gasket 55 and then through one of the respective air supply holes 18, 20 located on the side of the remote control 19. Air then flows into the selected air line, i.e., either the release line 27 or the hydraulic actuation pressure line 25.

Thus, when the pressure side air button 23, is depressed, air is applied on the pressure side, and the hydraulic pump 11 is caused to operate and generate hydraulic pressure. The air button 23 is continuously depressed during the interval when it is desired to apply hydraulic pressure via the pump 11. When the release side button 21 is depressed, air pressure is sent into the chamber 63 of the piston and cylinder device 29. As a result, the piston 65 is driven down to depress the hydraulic release button 31 located on the top of the hydraulic pump 11. Releasing pressure in this fashion can be done in intervals by intermittently pressing and releasing the button 21 on the remote control valve 19. The small anti-vacuum vent 79 prevents the piston from staying in the "down" mode when releasing hydraulic pressure and thereby facilitates intermittent partial pressure release operation.

Thus, the preferred embodiment provides a simple and effective remote control for air actuated hydraulic pumps. By provision of conventional "quickdisconnect" hydraulic fittings or couplings, a remote control according to the preferred embodiment can be readily disconnected from one hydraulic pump in a shop, carried to another pump in the shop, and quickly installed.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. An apparatus comprising:

a solid, single piece remote control valve body having an air supply inlet and first and second ducts located in the interior of said body and leading from said air supply inlet to respective first and second air valve chambers, said first and second air valve chambers also being located in the interior of said body;

first and second air outlets located in the interior of said body and communicating respectively with the first and second air valve chambers;

first and second air valves positioned in the respective first and second air valve chambers, each of said air valves including a switch actuable to cause air to be communicated from a respective one of said first and second ducts to a respective one of said first and second air outlets and a means mounted on a hydraulic pump and actuable in response to air pressure supplied through one of said air outlets to actuate a piston slideably mounted in said means, said piston being located adjacent a pressure release button on the hydraulic pump, said pressure release button being manually actuable to release pressure applied by said pump when said means is not mounted on said pump.

2. The apparatus of claim 1 wherein said means mounted on a hydraulic pump includes a chamber communicating with an anti-vacuum vent, said anti-vacuum vent enabling intermittent actuation of said pressure release button in response to intermittent operation of the switches of one of said first and second air valves.

3. The apparatus of claim 1 wherein each of said first and second air valves comprise:

an actuator portion slideably and sealably mounted in a valve body; and means actuated by said actuator portion for controlling the flow of air into a respective one of said first and second air outlets.

4. The apparatus of claim 3 wherein said means for controlling the flow of air comprises:

a gasket having an opening therein, said opening slideably receiving a plunger portion of said actuator portion; and a nose portion on said actuator portion shaped to close off air passage through said opening.

5. The apparatus of claim 1 wherein each of said first and second air valves comprise:

an actuator portion slideably and sealably mounted in a valve body and having a plunger portion extending out of said valve body;

a gasket having an opening therein, said opening slideably receiving said plunger portion; and a nose portion on said actuator portion shaped to close off air passage through said opening.

6. An apparatus comprising:

a solid, single piece remote control valve body having an air supply inlet and first and second ducts located in the interior of said body and leading from said air supply inlet to respective first and second chambers, said first and second chambers also being located in the interior of said body;

first and second air outlets located in the interior of said body and communicating respectively with the first and second chambers;

first and second means positioned in the respective first and second chambers and actuable to cause compressed air introduced at said air supply inlet to be communicated from a respective one of said first and second ducts to a respective one of said first and second air outlets; and a means mounted on a hydraulic pump and actuable in response to air pressure supplied through one of said at least one air outlets to actuate a piston slideably mounted in said means, said piston being located adjacent a pressure release button on the hydraulic pump, said pressure release button being manually actuable to release pressure applied by said pump when said means is not mounted on said pump.

7. The apparatus of claim 6 wherein said means mounted on a hydraulic pump includes a chamber communicating with an anti-vacuum vent, said anti-vacuum vent enabling intermittent actuation of said pressure release button in response to intermittent operation of the switches of one of said first and second air valves.

8. The apparatus of claim 6 wherein each of said first and second air valve means comprises:

an actuator portion slideably and sealably mounted in a valve body; and means actuated by said actuator portion for controlling the flow of air into a respective one of said first and second air outlets.

9. The apparatus of claim 8 wherein said means for controlling the flow of air comprises:

a gasket having an opening therein, said opening slideably receiving a plunger portion of said actuator portion; and a nose portion on said actuator portion shaped to close off air passage through said opening.

10. The apparatus of claim 6 wherein each of said first and second air valves comprise:

an actuator portion slideably and sealably mounted in a valve body and having a plunger portion extending out of said valve body;

a gasket having an opening therein, said opening slideably receiving said plunger portion; and a nose portion on said actuator portion shaped to close off air passage through said opening.

11. An apparatus comprising:

a solid, single piece remote control valve body having an air supply inlet located at a bottom end thereof, said inlet leading to a vertical passageway located within said body;

first and second ducts located in the interior of said solid, single piece body and branching off at respective acute angles from said vertical passageway, each said duct leading from said air supply inlet to a respective one of first and second vertically disposed air valve chambers, said first and second air valve chambers also being located in the interior of said solid, single piece body;

first and second air outlets located in the interior of said body and communicating respectively with the first and second air valve chambers;

first and second air valves positioned in the respective first and second air valve chambers, each of said air valves including a switch actuable to cause air to be communicated from a respective one of said first and second ducts to a respective one of said first and second air outlets; and a pressure release valve actuating device mounted on a hydraulic pump and actuable in response to air pressure supplied through one of said air outlets to actuate a piston slideably mounted in said means, said pressure release valve actuating device being located adjacent a pressure release button on the hydraulic pump, said pressure release button being manually actuable to release pressure applied by said pump when said pressure release valve actuating device is not mounted on said pump.

12. The apparatus of claim 11 wherein said pressure release valve actuating device mounted on a hydraulic pump includes a chamber communicating with an anti-vacuum vent operable to permit intermittent release of pressure by said pump upon intermittent actuation of the switch of one of said first and second air valves.

13. The apparatus of claim 11 wherein each of said first and second air valves comprise:

an actuator portion slideably and sealably mounted in a valve body; and means actuated by said actuator portion for controlling the flow of air into a respective one of said first and second air outlets.

14. The apparatus of claim 13 wherein each of said first and second air valves comprise:

a gasket having an opening therein, said opening slideably receiving a plunger portion of said actuator portion; and a nose portion on said actuator portion shaped to close off air passage through said opening.

* * * * *